United States Patent [19]
Durham

[11] Patent Number: 5,927,026
[45] Date of Patent: *Jul. 27, 1999

[54] SOLAR ENERGY SECURITY BUS SHELTER

[76] Inventor: Timothy H. Durham, 16 Fairvale Ln Tribe Rd 2, Ord Road, Warwick, Bermuda, WK09

[*] Notice: This patent is subject to a terminal disclaimer.

[21] Appl. No.: 09/050,877
[22] Filed: Mar. 31, 1998
[51] Int. Cl.⁶ .................................................. E04D 13/18
[52] U.S. Cl. .............................. 52/173.3; 49/74.1; 49/463
[58] Field of Search ........................................ 49/74.1, 463

[56] References Cited

U.S. PATENT DOCUMENTS

| | | | |
|---|---|---|---|
| 2,161,471 | 6/1939 | Hueglin | 49/74.1 |
| 3,991,518 | 11/1976 | Ishihara | 49/74.1 |
| 4,855,716 | 8/1989 | Jordal | 49/74.1 |
| 5,056,262 | 10/1991 | Schweiss et al. | 49/56 |
| 5,283,975 | 2/1994 | Piterski | 49/50 |
| 5,315,798 | 5/1994 | Zarwell | 52/202 |
| 5,649,395 | 7/1997 | Durham | 52/173.3 |

*Primary Examiner*—Carl D. Friedman
*Assistant Examiner*—Phi Dieu Tran A

[57] ABSTRACT

A solar energy security bus shelter including a floor having a front edge, a back edge, and side edges therebetween; a rear wall coupled to the floor and extending upwardly therefrom; forward supports extending upwardly from the floor adjacent to the front edge and adjacent side edges thereby defining a frame; windows formed in the opposite sides and front of the frame with associated framing to support the windows with respect to the frame with doors being mounted in openings formed in the frame; a roof mounted on the frame to cover the frame, the roof being formed of an insulated material with transparent skylights; a bench spaced upwardly from the floor adjacent the rear wall to define an air inlet to a heat collection chamber situated thereabove adjacent the rear wall; and windows extending upwardly from a rearward extent of the bench to a location adjacent to the roof thereby defining the heat collection chamber with an associated release flap pivotally mounted thereabove to open and close the exit of air from the heat collection chamber; wherein the windows formed in the opposite sides and front of the frame each include at least one column of small louvered windows, each louvered window being situated to define a plurality of rows and further pivotable such that the louvered windows may be pivoted between a closed orientation wherein the louvered windows remain in co-planar relationship and an open orientation for allowing a flow of air into the shelter.

8 Claims, 5 Drawing Sheets

SOLAR ENERGY SECURITY BUS SHELTER

BACKGROUND OF THE INVENTION

1. Field of the Invention

The present invention relates to a solar energy security bus shelter and, more particularly, pertains to enabling people waiting for a bus to wait in more safe and pleasant surroundings, especially in the coldest winter and hottest summer weather.

2. Description of the Prior Art

The use of shelters, houses and other buildings of various designs and configurations is known in the prior art. More specifically, shelters, houses and other buildings of various designs and configurations heretofore devised and utilized for the purpose of providing warmth to people through various methods and apparatuses are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,649,395 to Durham a bus shelter having means for heating the same during winter weather. Such patent, however, fails to teach any means of dealing with the heat of summer weather while still preserving the secure nature of the bus shelter.

Further examples of the prior art include U.S. Pat. No. Des. 250,837 to Lahaie which discloses a shelter. U.S. Pat. No. Des. 252,215 to Leuthesser discloses a bus stop shelter. U.S. Pat. No. Des. 294,300 to Hoelterhoff et al. discloses a bus stop shelter. U.S. Pat. No. 3,762,109 to Cohen discloses bus shelters. Lastly, U.S. Pat. No. 3,735,536 to Bellasalma discloses a bus stop shelter.

In this respect, the solar energy security bus shelter according to the present invention substantially departs from the conventional concepts and designs of the prior art, and in so doing provides an apparatus primarily developed for the purpose of enabling people waiting for a bus to wait in more safe and pleasant surroundings, especially in the coldest winter and hottest summer weather.

Therefore, it can be appreciated that there exists a continuing need for a new and improved solar energy security bus shelter which can be used for to enable people waiting for a bus to wait in more safe and pleasant surroundings, especially in the coldest winter and hottest summer weather. In this regard, the present invention substantially fulfills this need.

SUMMARY OF THE INVENTION

In view of the foregoing disadvantages inherent in the known types of shelters, houses and other buildings of various designs and configurations now present in the prior art, the present invention provides an improved solar energy security bus shelter. As such, the general purpose of the present invention, which will be described subsequently in greater detail, is to provide a new and improved solar energy security bus shelter and method which has all the advantages of the prior art and none of the disadvantages.

To attain this, the present invention essentially comprises a concrete floor in a rectangular configuration having a front edge, a parallel back edge, and parallel side edges therebetween; a concrete rear wall with adjacent parallel short side coupled to the floor and extending upwardly therefrom; forward L-shaped concrete supports extending upwardly from the floor adjacent to the front edge and adjacent side edges, the rear wall being at an elevated height with respect to the froward supports thereby defining a frame; concrete legs extending downwardly from the floor positionable in the ground with enlarged lower extents for stabilizing purposes; the floor also having a pair of forwardly extending concrete ramps, construction of the floor, rear wall, side, forward supports, legs, and ramps constitute a structure being fabricated in a one piece construction from concrete; windows formed in the opposite sides and front of the frame with associated framing to support the windows with respect to the frame with doors being mounted in openings formed in the frame above the ramps; a roof mounted on the frame to cover the frame, the roof being formed of an insulated material with transparent skylights in the central extent thereof; a concrete bench spaced upwardly from the floor and forwardly of the rear wall to define an air inlet to a heat collection chamber situated thereabove adjacent the rear wall; double glazed windows extending upwardly from a rearward extent of the bench to a location adjacent to the roof thereby defining the heat collection chamber with an associated release flap pivotally mounted thereabove to open and close the exit of air from the heat collection chamber with an associated thermally controlled switch; a thermostat to open and close the switch and flap to permit and prohibit the flow of heated air from the heat collection chamber; a motion detector to determine the presence of occupants within the shelter with associated lights on the roof to indicate the presence and absence of a person within the shelter; wherein the windows formed in the opposite sides and front of the frame each include a pair of columns of small rectangular louvered windows, each louvered window being situated to define a plurality of rows and further pivotable about an axis coincident with a top edge thereof such that the louvered windows may be pivoted between a closed orientation wherein the louvered windows remain in co-planar relationship and an open orientation wherein the louvered windows pivot outwardly for allowing a flow of air into the shelter; a screen mounted within the framing between an interior of the shelter and the louvered windows for protecting occupants of the shelter and further preventing tampering with the interior of the shelter; and tampering detection means for providing an indication upon the tampering with the screen.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved solar energy security bus shelter which has all the advantages of the prior art shelters, houses and other buildings of various designs and configurations and none of the disadvantages.

It is another object of the present invention to provide a new and improved solar energy security bus shelter which may be easily and efficiently manufactured and marketed.

It is a further object of the present invention to provide a new and improved solar energy security bus shelter which is of a durable and reliable construction.

An even further object of the present invention is to provide a new and improved solar energy security bus shelter which is susceptible of a low cost of manufacture with regard to both materials and labor, and which accordingly is then susceptible of low prices of sale to the consuming public, thereby making such shelters, houses and other buildings of various designs and configurations economically available to the buying public.

Still yet another object of the present invention is to provide a new and improved solar energy security bus shelter which provides in the apparatuses and methods of the prior art some of the advantages thereof, while simultaneously overcoming some of the disadvantages normally associated therewith.

Even still another object of the present invention is to enable people waiting for a bus to wait in more safe and pleasant surroundings, especially in the coldest winter weather and hottest summer.

Lastly, it is an object of the present invention to provide a solar energy security bus shelter including a floor having a front edge, a back edge, and side edges therebetween; a rear wall coupled to the floor and extending upwardly therefrom; forward supports extending upwardly from the floor adjacent to the front edge and adjacent side edges thereby defining a frame; windows formed in the opposite sides and front of the frame with associated framing to support the windows with respect to the frame with doors being mounted in openings formed in the frame; a roof mounted on the frame to cover the frame, the roof being formed of an insulated material with transparent skylights; a bench spaced upwardly from the floor adjacent the rear wall to define an air inlet to a heat collection chamber situated thereabove adjacent the rear wall; and windows extending upwardly from a rearward extent of the bench to a location adjacent to the roof thereby defining the heat collection chamber with an associated release flap pivotally mounted thereabove to open and close the exit of air from the heat collection chamber; wherein the windows formed in the opposite sides and front of the frame each include at least one column of small louvered windows, each louvered window being situated to define a plurality of rows and further pivotable such that the louvered windows may be pivoted between a closed orientation wherein the louvered windows remain in co-planar relationship and an open orientation for allowing a flow of air into the shelter.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
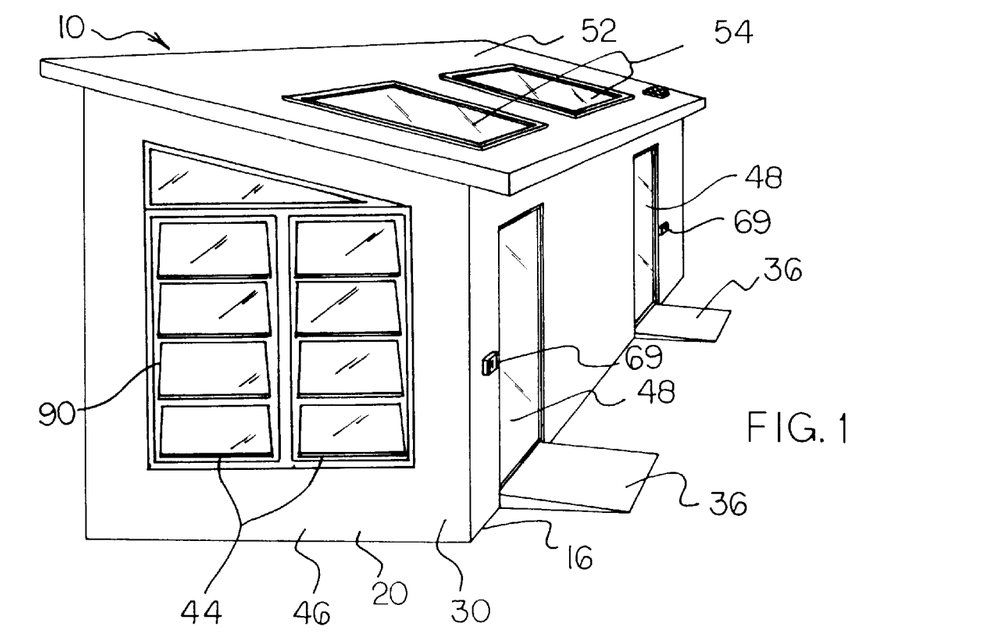
FIG. 1 is a perspective illustration of the preferred embodiment of the solar energy security bus shelter constructed in accordance with the principles of the present invention.
Figure 2:
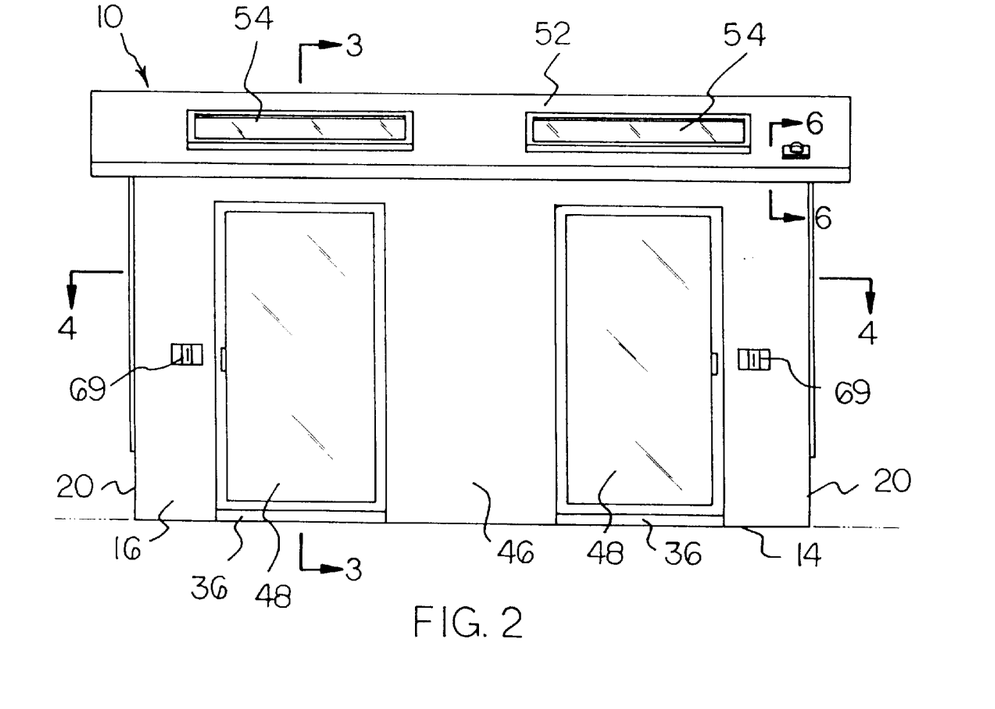
FIG. 2 is a front elevational view of the shelter shell in FIG. 1.
Figure 3:
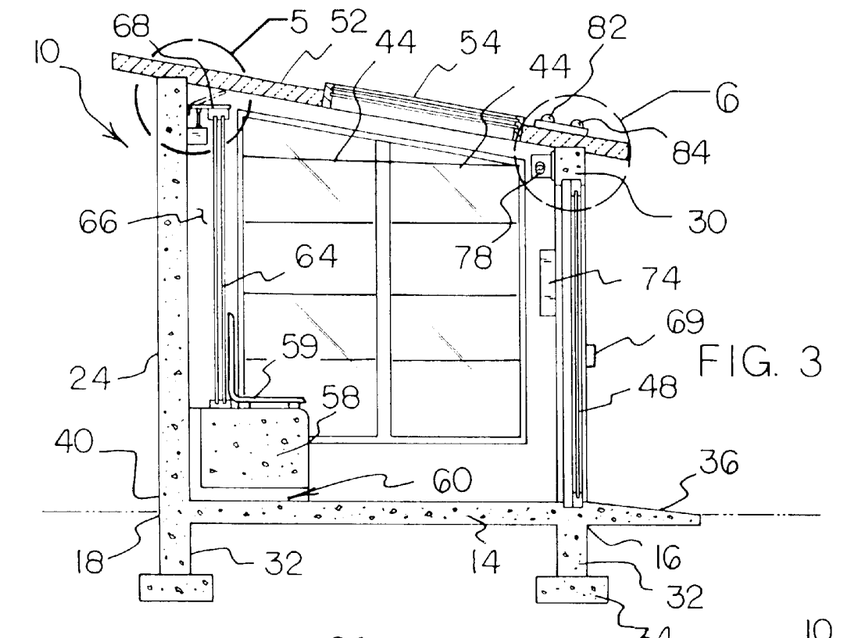
FIG. 3 is a cross sectional view taken along line 3—3 of FIG. 2.
Figure 4:
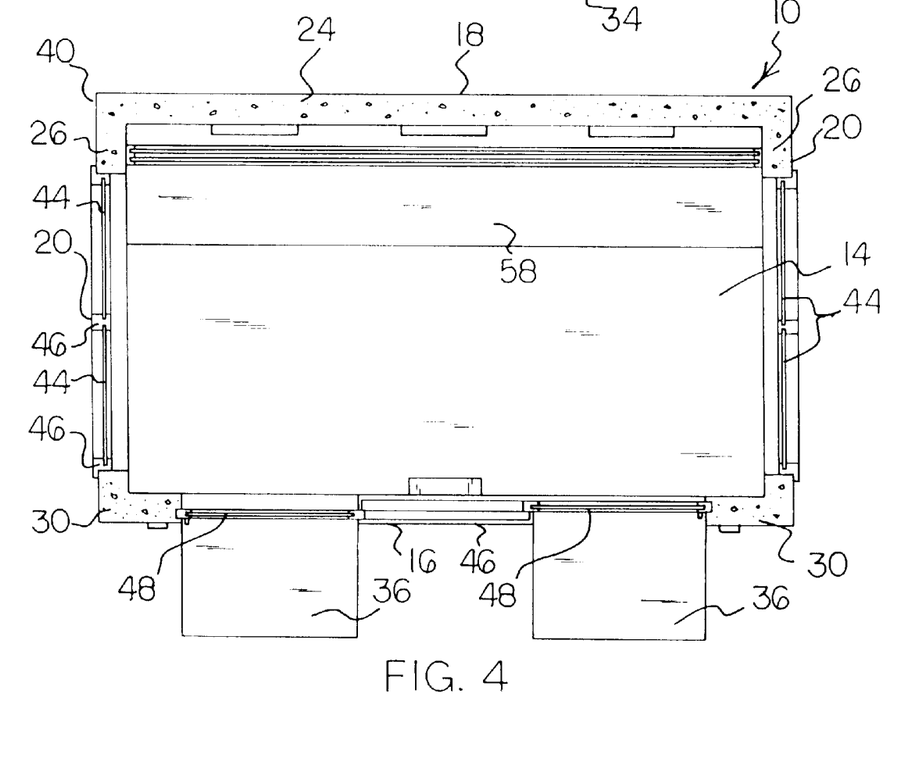
FIG. 4 is a cross sectional view taken along line 4—4 of FIG. 2.
Figure 5:
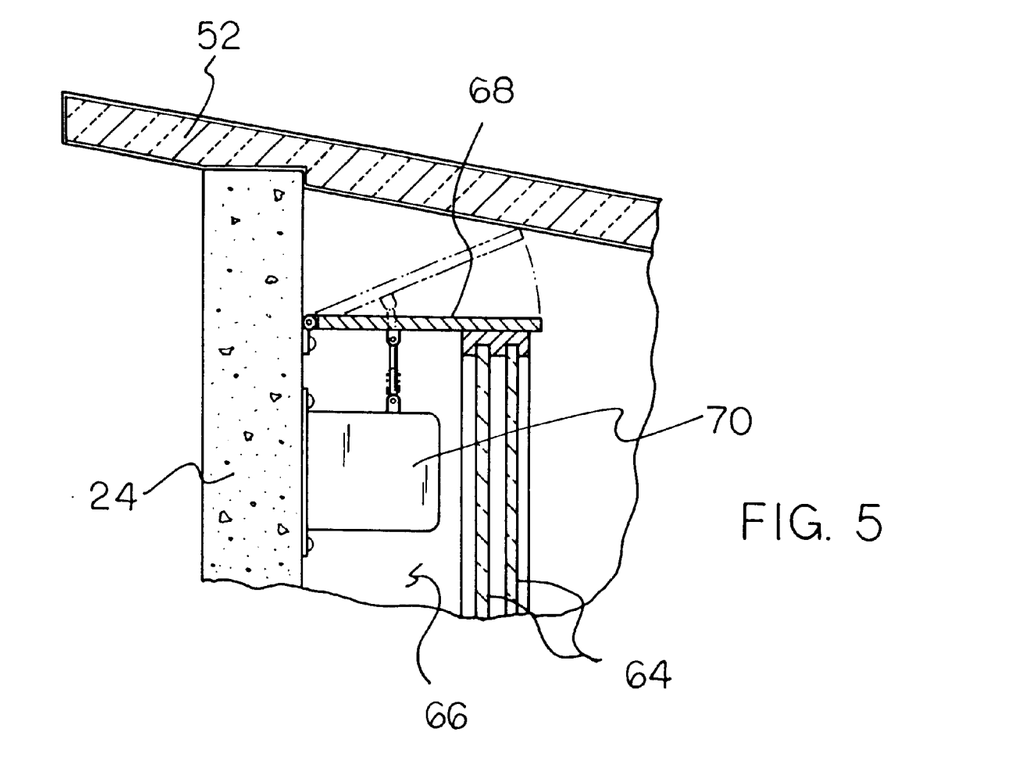
FIG. 5 is an enlarged cross sectional view of the region of FIG. 3 taken at circle 5.
Figure 6:
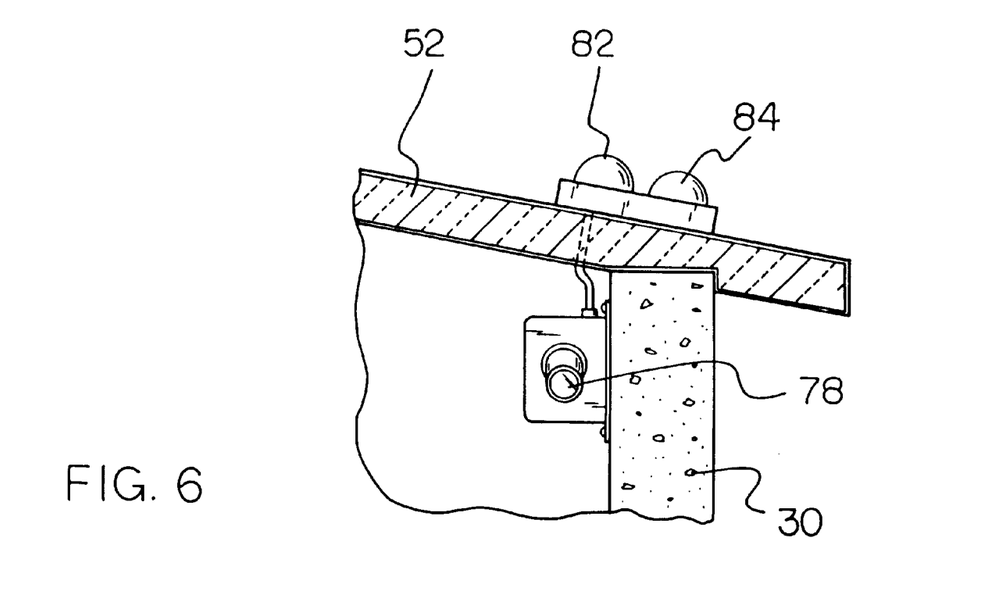
FIG. 6 is an enlarged cross sectional view taken at circle 6 of FIG. 3.

With reference now to the drawings, and in particular to FIG. 1 thereof, the preferred embodiment of the new and improved solar energy security bus shelter embodying the principles and concepts of the present invention and generally designated by the reference numeral 10 will be described.

The present invention, the new and improved solar energy security bus shelter, is a system 10 comprised of a plurality of components. In their broadest context, the components include a floor, walls, supports, ramps, windows, a roof, a bench, a flap, a thermostat, and a motion detector. Each of the individual components is specifically configured and correlated one with respect to the other so as to attain the desired objectives.

More specifically, the system 10 of the present invention includes a concrete floor 12. Such floor is in a rectangular configuration. It has a front edge 16, a parallel back edge 18, and parallel side edges 20. The side edges extend between the front and back edges.

Next provided is a concrete rear wall 24. Such rear wall is has adjacent parallel short sides 26. The rear wall and side edges are coupled to the floor and extend upwardly therefrom.

Also, coupled with respect to the floor are a pair of forward L-shaped concrete supports 30. Such forward supports extend upwardly from the floor adjacent to the front edge and adjacent regions of the side edges. The rear wall is located at an elevated height with respect to the forward supports.

Also, coupled with respect to the floor are concrete legs 32. Such legs extend downwardly from the floor and are positionable in the ground. They have enlarged lower extents 34 for stabilizing purposes.

The floor also has a pair of forwardly extending concrete ramps 36. Such ramps are for entry into the shelter and departure therefrom. They are particularly convenient for disabled people in wheelchairs. The floor, rear wall, sides, forward supports, leg, and ramps constitute a frame 40 which is a structure fabricated in a one piece construction, preferably from concrete.

Next provided are windows 44. The windows are formed in the opposite sides and front of the frame. In association therewith is framing 46 of a rigid insulative material. The framing is to support the windows with respect to the concrete frame. Doors 48 are mounted in openings formed in the front framing above the ramps.

A roof 52 is next mounted to the frame. The roof functions to cover the entire frame for shielding from the elements. The roof tilts forwardly from the rear base to the front base. The roof is formed of a plastic insulated material. It is formed with at least a pair of skylights 54 in the central extent thereof. This is to allow the entrance of solar energy into the shelter for heating purposes.

Located within the shelter is a concrete bench 58. Such bench is spaced upwardly from the floor and forwardly of the rear wall. This defines an air inlet 60 beneath and to the rear of the bench adjacent to the rear wall. Concrete spacing components may preferably extend downwardly from the lower surface of the bench and spaced for support purposes while allowing a plurality of air inlets beneath the bench.

Extending upwardly from the rearward extent of the seat are double glazed windows 64. Such windows extend upwardly to a location adjacent to the roof. The windows and rear wall form a heat collection chamber 66 wherein heat from the shelter may be entered, collected, and stored until needed. In association with the chamber 66, is an associated release flap 68 pivotally mounted to the rear wall above the collection chamber. The flap functions to open and close the exit of air from the heat collection chamber. In association therewith is an associated thermally controlled switch 70. Located on a forward support 30 is a thermostat 74. The thermostat functions to open and close the switch and hence the flap. This functions to permit and prohibit the flow of heated air from the heat collection chamber into the central extent of the shelter as is needed. The thermostat allows the flap to be opened when a low temperature is detected and closed when a high temperature is detected.

Another component of the system is a motion detector 78. The motion detector is preferably located adjacent to the thermostat. It functions to determine the presence or absence of occupants within the shelter. In association with the motion detector are associated lights 80, 82. Such lights are located on top of the roof. Together the motion detector and lights indicate the presence and absence of a person within the shelter to a person outside of the shelter. Such motion detector is utilized to activate the lights upon the detection of motion and deactivate the lights upon the lack of detection of motion.

In the preferred embodiment, the windows formed in the opposite sides and front of the frame each include a pair of columns of small rectangular louvered windows 90. Note FIGS. 7–9. The louvered windows are configured to define a plurality of rows. In the preferred embodiment, the louvered windows define a 4×2 matrix. Further, the length of each louvered window is preferably greater than the height thereof.

Figure 7:
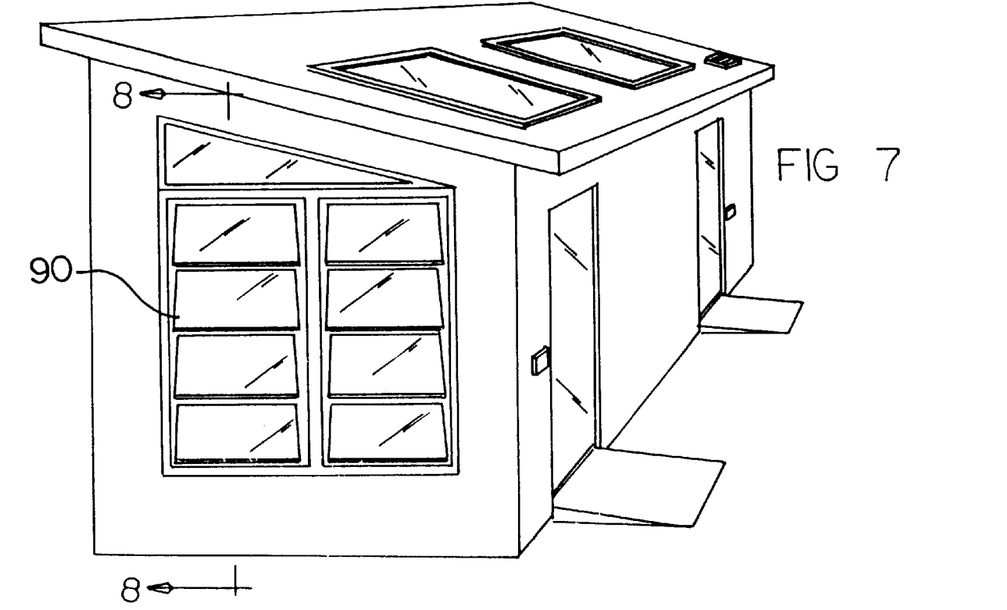
FIG. 7 is a perspective view of the present invention showing the louvered windows of the preferred embodiment.
Figure 8:
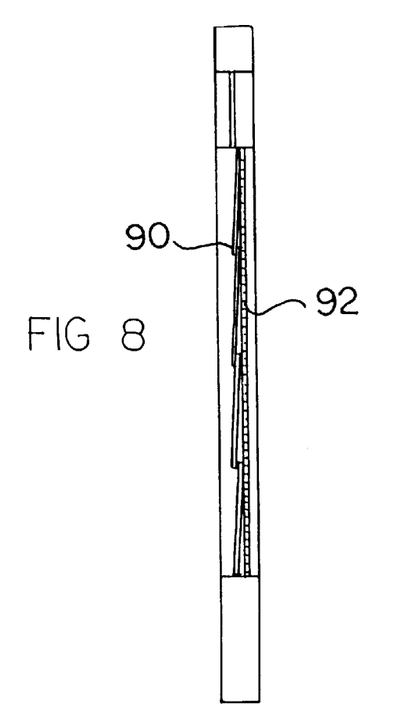
FIG. 8 is a cross-sectional view of the louvered windows of the present invention taken along line 8—8 shown in FIG. 7.
Figure 9:
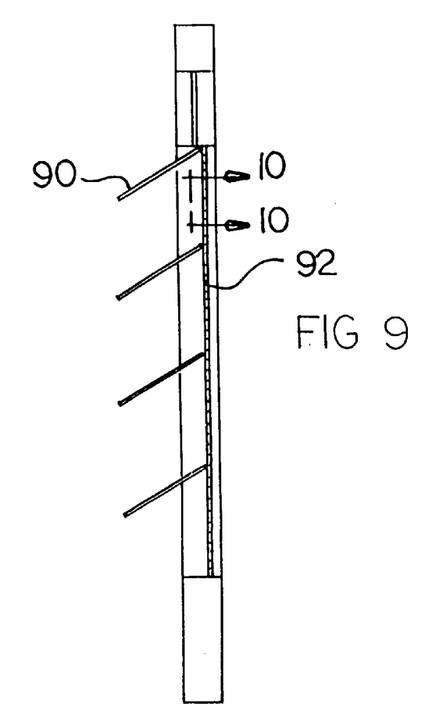
FIG. 9 is another cross-sectional view of the louvered windows shown in an open orientation.

During use, the louvered windows are pivotable about an axis coincident with a top edge thereof. As such, the louvered windows may be pivoted between a closed orientation wherein the louvered windows remain in co-planar relationship. Further, the louvered windows are capable of pivoting outwardly to an open orientation for allowing a flow of air into the shelter. This is especially critical in summer months for ventilation purposes.

As best shown in FIGS. 8–9, a high gauge screen 92 is mounted within the framing between an interior of the shelter and the louvered windows. The screen serves to protect occupants of the shelter and further prevent tampering with the interior of the shelter. As an option, a tampering detection means may be included for providing an indication upon the tampering with the screen. The indication preferably takes the form of a light such as those associated with the motion sensors. Such lights are uniquely illuminated when the screen is tampered with. For example, the lights may be flashed or the like.

Figure 10:
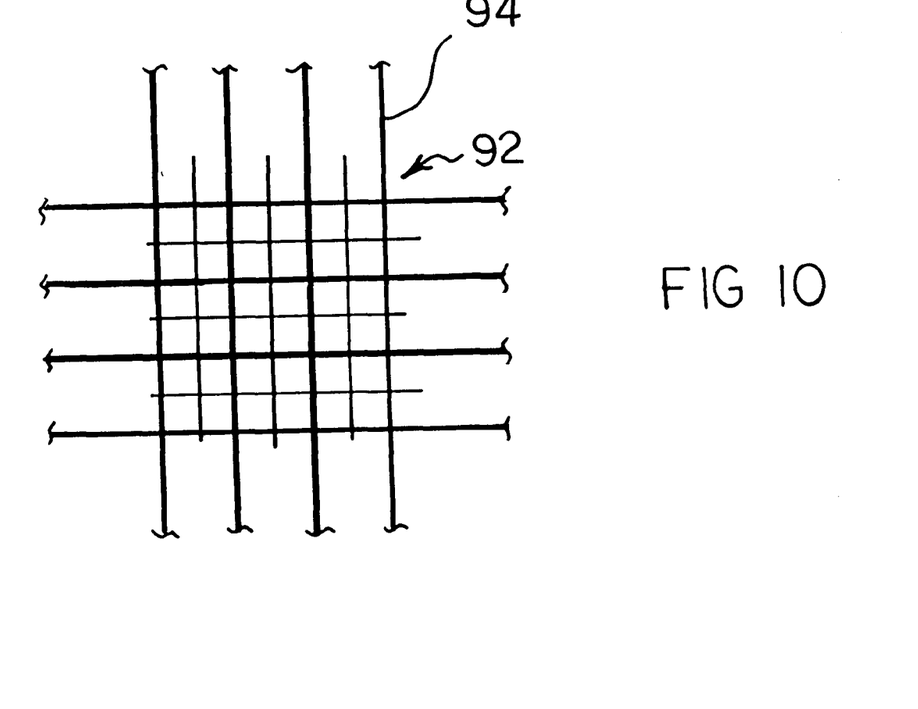
FIG. 10 is a close-up view of the screen of the present invention.
Figure 11:
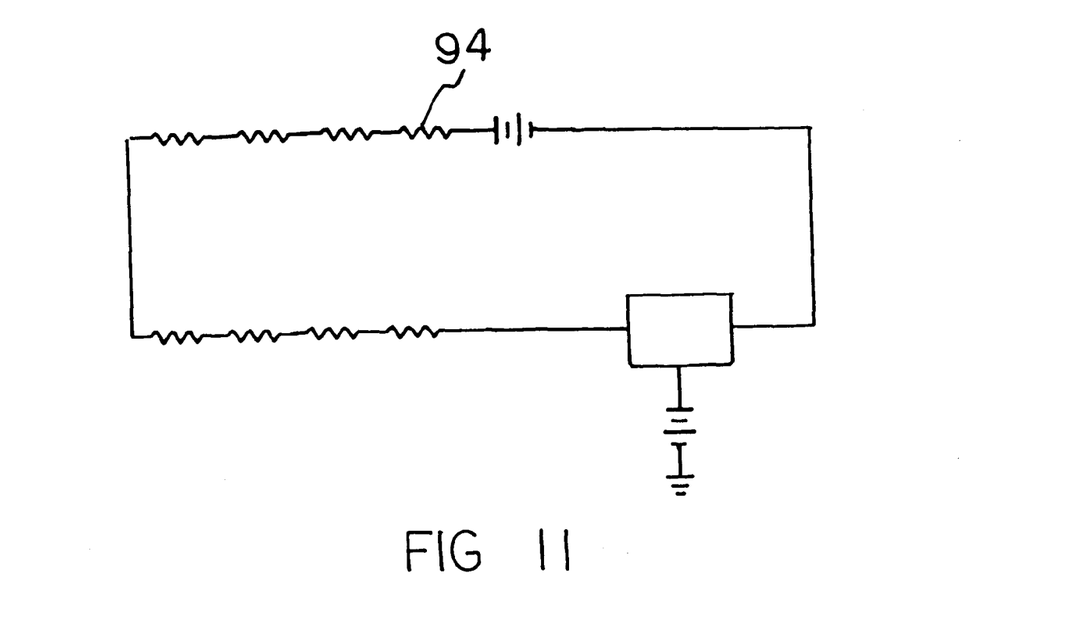
FIG. 11 is a schematic diagram of the wires associated with the screen of the present invention.

To accomplish the foregoing, the screen may include small insulated meshed wires 94 integrated with the conventional wires of the screen. Such wires are preferably connected in series such that when an intruder attempts to invade the shelter, a signal is generated which in turn illuminates the light. A relay switch or the like may be used to accomplish this.

The present invention is a bus shelter that is heated by solar energy. It enables people waiting for a bus to wait in more safe and pleasant surroundings, especially in the coldest winter weather. The shelter is mostly comprised of concrete elements, with two skylights on top. The present invention has a front wall and a back wall. Heat is collected and stored between the cement walls and between a layer of double glazed windows at the rear of the shelter. Vents along the top of the interior of the shelter are controlled by a thermostat and regulate the flow of stored heated air. The shelter further has a plurality of louvered windows for permitting ventilation during summer weather. The shelter has two doorways, each are accessible by at least one ramp. Lighting is also included to indicate whether or not there are occupants waiting inside of the shelter.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved solar energy security bus shelter comprising, in combination:

a concrete floor in a rectangular configuration having a front edge, a parallel back edge, and parallel side edges therebetween;

a concrete rear wall with adjacent parallel short side coupled to the floor and extending upwardly therefrom;

forward L-shaped concrete supports extending upwardly from the floor adjacent to the front edge and adjacent side edges, the rear wall being at an elevated height with respect to the forward supports thereby defining a frame;

concrete legs extending downwardly from the floor positionable in the ground with enlarged lower extents for stabilizing purposes;

the floor also having a pair of forwardly extending concrete ramps, construction of the floor, rear wall, side, forward supports, legs, and ramps constitute a structure being fabricated in a one piece construction from concrete;

windows formed in the opposite sides and front of the frame with associated framing to support the windows with respect to the frame with doors being mounted in openings formed in the frame above the ramps;

a roof mounted on the frame to cover the frame, the roof being formed of an insulated material with transparent skylights in the central extent thereof;

a concrete bench spaced upwardly from the floor and forwardly of the rear wall to define an air inlet to a heat collection chamber situated thereabove adjacent the rear wall;

double glazed windows extending upwardly from a rearward extent of the bench to a location adjacent to the roof thereby defining the heat collection chamber with an associated release flap pivotally mounted thereabove to open and close the exit of air from the heat collection chamber with an associated thermally controlled switch;

a thermostat to open and close the switch and flap to permit and prohibit the flow of heated air from the heat collection chamber;

a motion detector to determine the presence of occupants within the shelter with associated lights on the roof to indicate the presence and absence of a person within the shelter;

wherein the windows formed in the opposite sides and front of the frame each include a pair of columns of small rectangular louvered windows, each louvered window being situated to define a plurality of rows and further pivotable about an axis coincident with a top edge thereof such that the louvered windows may be pivoted between a closed orientation wherein the louvered windows remain in co-planar relationship and an open orientation wherein the louvered windows pivot outwardly for allowing a flow of air into the shelter;

a screen mounted within the framing between an interior of the shelter and the louvered windows for protecting occupants of the shelter and further preventing tampering with the interior of the shelter; and tampering detection means for providing an indication upon the tampering with the screen.

2. A solar energy security bus shelter comprising:

a floor having a front edge, a back edge, and side edges therebetween;

a rear wall coupled to the floor and extending upwardly therefrom;

forward supports extending upwardly from the floor adjacent to the front edge and adjacent side edges thereby defining a frame;

windows formed in the opposite sides and front of the frame with associated framing to support the windows with respect to the frame with doors being mounted in openings formed in the frame;

a roof mounted on the frame to cover the frame, the roof being formed of an insulated material with transparent skylights;

a bench spaced upwardly from the floor adjacent the rear wall to define an air inlet to a heat collection chamber situated thereabove adjacent the rear wall; and windows extending upwardly from a rearward extent of the bench to a location adjacent to the roof thereby defining the heat collection chamber with an associated release flap pivotally mounted thereabove to open and close the exit of air from the heat collection chamber;

wherein the windows formed in the opposite sides and front of the frame each include at least one column of small louvered windows, each louvered window being situated to define a plurality of rows and further pivotable such that the louvered windows may be pivoted between a closed orientation wherein the louvered windows remain in co-planar relationship and an open orientation for allowing a flow of air into the shelter.

3. A solar energy security bus shelter as set forth in claim 2 wherein each louvered window pivots about an axis coincident with a top edge thereof.

4. A solar energy security bus shelter as set forth in claim 2 wherein the louvered windows pivot outwardly.

5. A solar energy security bus shelter as set forth in claim 2 wherein a screen is mounted between an interior of the shelter and the louvered windows for protecting occupants of the shelter and further preventing tampering with the interior of the shelter.

6. A solar energy security bus shelter as set forth in claim 5 and further provided is tampering detection means for providing an indication upon the tampering with the screen.

7. A solar energy security bus shelter comprising:

a floor having a front edge, a back edge, and side edges therebetween;

a rear wall coupled to the floor and extending upwardly therefrom;

forward supports extending upwardly from the floor adjacent to the front edge and adjacent side edges thereby defining a frame;

windows formed in the opposite sides and front of the frame with associated framing to support the windows with respect to the frame with doors being mounted in openings formed in the frame;

a roof mounted on the frame to cover the frame, the roof being formed of an insulated material with transparent skylights;

a bench spaced upwardly from the floor adjacent the rear wall to define an air inlet to a heat collection chamber situated thereabove adjacent the rear wall; and windows extending upwardly from a rearward extent of the bench to a location adjacent to the roof thereby defining the heat collection chamber with an associated release flap pivotally mounted thereabove to open and close the exit of air from the heat collection chamber;

wherein the windows formed in the opposite sides and front of the frame are openable for allowing a flow of air into the shelter;

wherein a screen is mounted between an interior of the shelter and the windows formed in the opposite sides and front of the frame for protecting occupants of the shelter and further preventing tampering with the interior of the shelter.

8. A solar energy security bus shelter as set forth in claim 7 and further provided is tampering detection means for providing an indication upon the tampering with the screen.

* * * * *